US008370525B2

(12) United States Patent
Sun et al.

(10) Patent No.: US 8,370,525 B2
(45) Date of Patent: Feb. 5, 2013

(54) TRANSMITTING NEW DATA FORMAT UNDER EXISTING INFRASTRUCTURE

(75) Inventors: Jiming Sun, Portland, OR (US); Dennis L. Holmbo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1502 days.

(21) Appl. No.: 09/822,735

(22) Filed: Mar. 30, 2001

(65) Prior Publication Data
US 2002/0143994 A1 Oct. 3, 2002

(51) Int. Cl.
G06F 15/16 (2006.01)
(52) U.S. Cl. .......................................... 709/246; 709/206
(58) Field of Classification Search .................. 709/246, 709/230, 236, 247; 382/244, 173; 347/92, 347/7, 209, 40, 19, 13, 41, 43, 251, 184, 347/2; 358/296, 502, 1.16, 527; 283/72, 283/95
See application file for complete search history.

(56) References Cited

U.S. PATENT DOCUMENTS

| | | | |
|---|---|---|---|
| 5,309,555 A | 5/1994 | Akins et al. | |
| 5,442,679 A | 8/1995 | Regis et al. | |
| 5,539,886 A | 7/1996 | Aldred | |
| 5,561,446 A | 10/1996 | Montlick | |
| 5,579,472 A | 11/1996 | Keyworth, II et al. | |
| 5,680,617 A | 10/1997 | Gough et al. | |
| 5,740,245 A | 4/1998 | Bennett et al. | |
| 5,751,793 A | 5/1998 | Davies et al. | |
| 5,838,302 A | 11/1998 | Kuriyama et al. | |
| 5,864,772 A | 1/1999 | Alvarado et al. | |
| 5,867,112 A * | 2/1999 | Kost | 341/51 |
| 5,894,305 A | 4/1999 | Needham | |
| 5,926,567 A * | 7/1999 | Collins et al. | 382/187 |
| 5,940,082 A | 8/1999 | Brinegar et al. | |
| 5,984,305 A | 11/1999 | Inoue | |
| 6,240,444 B1 | 5/2001 | Fin et al. | |
| 6,301,609 B1 | 10/2001 | Aravamudan et al. | |
| 6,304,898 B1 | 10/2001 | Shiigi | |
| 6,311,042 B1 | 10/2001 | DeSchrijver | |
| 6,370,581 B2 * | 4/2002 | Rader | 709/230 |
| 6,384,829 B1 | 5/2002 | Prevost et al. | |
| 6,415,256 B1 * | 7/2002 | Ditzik | 704/231 |
| 6,487,584 B1 | 11/2002 | Bunney | |
| 6,549,675 B2 * | 4/2003 | Chatterjee | 382/244 |
| 6,557,029 B2 | 4/2003 | Szymansky | |
| 6,697,352 B1 * | 2/2004 | Ludwig et al. | 370/349 |

(Continued)

FOREIGN PATENT DOCUMENTS

EP 0776107 5/1997

OTHER PUBLICATIONS

Ferschmann, Petr; Diploma Thesis: Instant Messaging in Corporate Networks; University of West Bohemia in Pilsen, 2004.*

(Continued)

Primary Examiner — Barbara Burgess
(74) Attorney, Agent, or Firm — Blakely, Sokoloff, Taylor & Zafman LLP

(57) ABSTRACT

A method and apparatus for implementing ink data communication between multiple parties using computing and/or communication devices on a network is disclosed. An electronic chat system comprising a hardware interface layer for receiving raw ink data from an input device, an ink management layer for processing the raw ink data into a form useable by a chat interface layer, and a network interface layer for transferring the processed ink data across a network to a chat interface layer on a remote computer.

12 Claims, 7 Drawing Sheets

U.S. PATENT DOCUMENTS

| | | | |
|---|---|---|---|
| 6,704,493 B1* | 3/2004 | Matthews et al. | 386/324 |
| 6,847,365 B1* | 1/2005 | Miller et al. | 345/502 |
| 7,136,710 B1* | 11/2006 | Hoffberg et al. | 700/83 |
| 2001/0053978 A1* | 12/2001 | Lewis et al. | 704/275 |
| 2002/0037107 A1* | 3/2002 | Trachtman | 382/232 |
| 2002/0081027 A1* | 6/2002 | Chatterjee et al. | 382/173 |
| 2002/0099788 A1 | 7/2002 | Szymansky | |
| 2002/0109706 A1* | 8/2002 | Lincke et al. | 345/700 |
| 2002/0130904 A1* | 9/2002 | Becker et al. | 345/753 |
| 2002/0136462 A1* | 9/2002 | Hebert, Jr. | 382/246 |
| 2003/0018558 A1* | 1/2003 | Heffner et al. | 705/37 |
| 2003/0163525 A1* | 8/2003 | Hendriks et al. | 709/204 |
| 2006/0031764 A1* | 2/2006 | Keyser et al. | 715/525 |
| 2006/0148527 A1* | 7/2006 | Blount | 455/566 |
| 2006/0233441 A1* | 10/2006 | Clary | 382/187 |
| 2009/0164595 A1* | 6/2009 | Shiigi | 709/206 |

OTHER PUBLICATIONS

Meyer, Andre; Pen Computing—A Technology Overview and a Vision; SIGCHI Bulletin Jul. 1995; vol. 27, No. 3.*

Harry Newton, Newton Telecom Dictionary, Feb. 2002, CMP Books, 18th Edition, p. 546.*

Oikarinen, J., et al.; "Internet Relay Chat Protocol," http://www.cis.ohio-state,edu/htbin/rfc/rfc1459html/, May 1993, pp. 1-56.

Tang, John C., et al.; "Videodraw: A Video Interface for Collaborative Drawing;" System Sciences Laboratory, Xerox Palo Alto Research Center, CHI '90 Proceedings, Apr. 1990, 8.

Rooney, Paula; Microsoft delays release of messaging-server software; PC Week, vol. 10, No. 23, Jun. 14, 1993; 3 pages.

Rath, Douglas, eShare Technologies (Product Reviews); Computer Reseller News, 1997, n 767, 2 pages.

Vaughn-Nichols, Steven J.; Connect Time; new CIS message software; 1-800 access for GEnie; relay-chat for Delphi, Computer Shopper, v 13, n5, May 1993, 5 pages.

Meyer, Andre, "Pen Computing: A Technology Overview and a Vision", SIGCHI Bulletin, vol. 27, No. 3, Jul. 1995, pp. 46-90.

Ferschmann, Petr, "Diploma Thesis: Instant Messaging in Corporate Networks", University of West Bohemia in Pilsen, Dept. of Comp. Sci. and Engineering, 2004.

* cited by examiner

TRANSMITTING NEW DATA FORMAT UNDER EXISTING INFRASTRUCTURE

FIELD OF THE INVENTION

The present invention relates to the field of communication. More specifically, the present invention relates to ink data communication on a network.

BACKGROUND OF THE INVENTION

Chat room services from Internet service providers and on-line services provide an informal, public meeting place where multiple participants from all over the world can converse in text, in audio, or through a shared white board. Chat rooms may be maintained by a single server or a plurality of servers spread out over a large area, connected by a network.

A typical chat room service relies on two basic components of Transfer Control Protocol/Internet Protocol (TCP/IP), the networking protocol upon which the Internet is based, clients and servers. Clients run software that allows them to connect to a server. Other implementations allow a peer-to-peer chat communication. In the client/server implementation, the server accepts connections from one or more clients at the same time. A plurality of servers are typically interconnected. From one server, a client can access the conferences and users on other servers. The plurality of servers provide the supporting structure that allow the chat room service to work. The servers maintain information on the current available chat rooms. Every time a new room is created, the information about it is passed to every other server on the network. Servers also administer which clients are currently connected and what options and features they have set up. All of this information is exchanged between servers as it is changed. A typical chat system, Internet Relay Chat (IRC), is described in the Internet RFC1459, "Internet Relay Chat Protocol".

Current chat room services offer poor support for non-ASCII characters, making communication in languages other than English, such as ideographic languages, difficult. Furthermore, current chat room services offer poor support for sharing graphical or ink data messages among clients. Conventional ink data refers to a simple set of information related to the movement of a pen device over an electronic tablet.

In the past, some services allowed a plurality of clients to use a shared white board for sending graphical messages between clients. Each client system had a video camera directed to a white board at the client's site. The images captured by the video camera would be sent to a server. The server would superimpose the images received by each of the video cameras upon each other and send the new image to each of the clients to display The use of a shared white board had several drawbacks. One drawback of using a shared white board is that linear conversation could not be conducted easily through the shared graphical space. When more than two clients shared a white board, it was difficult for one to determine which client was making a contribution to the shared white board and there were difficulties in keeping track of the order when each contribution was made. Another drawback of using a shared white board was that after the white board was filled, clients had to wait for other clients to erase the contents on their white board before further contribution could be made.

One special case use of chat is conventional instant messaging, whereby one client can instantly send and receive messages to/from one other client. Traditionally, instant messaging (IM) is used to quickly transfer short text messages between two networked users. Longer or more complex messages or documents can be transferred among networked users in a less timely way using conventional email. Traditional email systems support the transfer of documents composed in a variety of formats including text, graphics, GIF, JPEG, bitmap, EXE, and many others. However, the conventional IM and chat infrastructure is more limited to a very few data formats, predominantly ASCII text and/or voice formats.

As the IM and chat user base grows, it will be increasingly important to support data types other than simple ASCII text and/or voice. One such data type currently not supported by conventional IM or chat systems is a handwriting data type such as ink data. The use of ink data is particularly important in applications where conventional text data is less efficient. For example, many languages other than English use symbols, which are more efficiently drawn by hand rather than typed on a text-oriented keyboard. For another example, some portable devices, such as personal digital assistants (PDAs), cell phones, handheld devices, pagers, and the like are more efficiently used with a pen-input device. A pen-input device is more efficient for the entry of ink data rather than conventional text, unless handwriting recognition software is used. However, handwriting recognition software typically consumes many system resources.

BRIEF DESCRIPTION OF THE DRAWINGS

The present invention is illustrated by way of example and not by way of illustration in the figures of the accompanying drawings, in which like references indicate similar elements and in which.

DETAILED DESCRIPTION

A method and apparatus for implementing ink data communication between multiple parties using computing and/or communication devices on a network is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes, and interfaces have not been shown or described in detail in order not to unnecessarily obscure the present invention.

Figure 1:
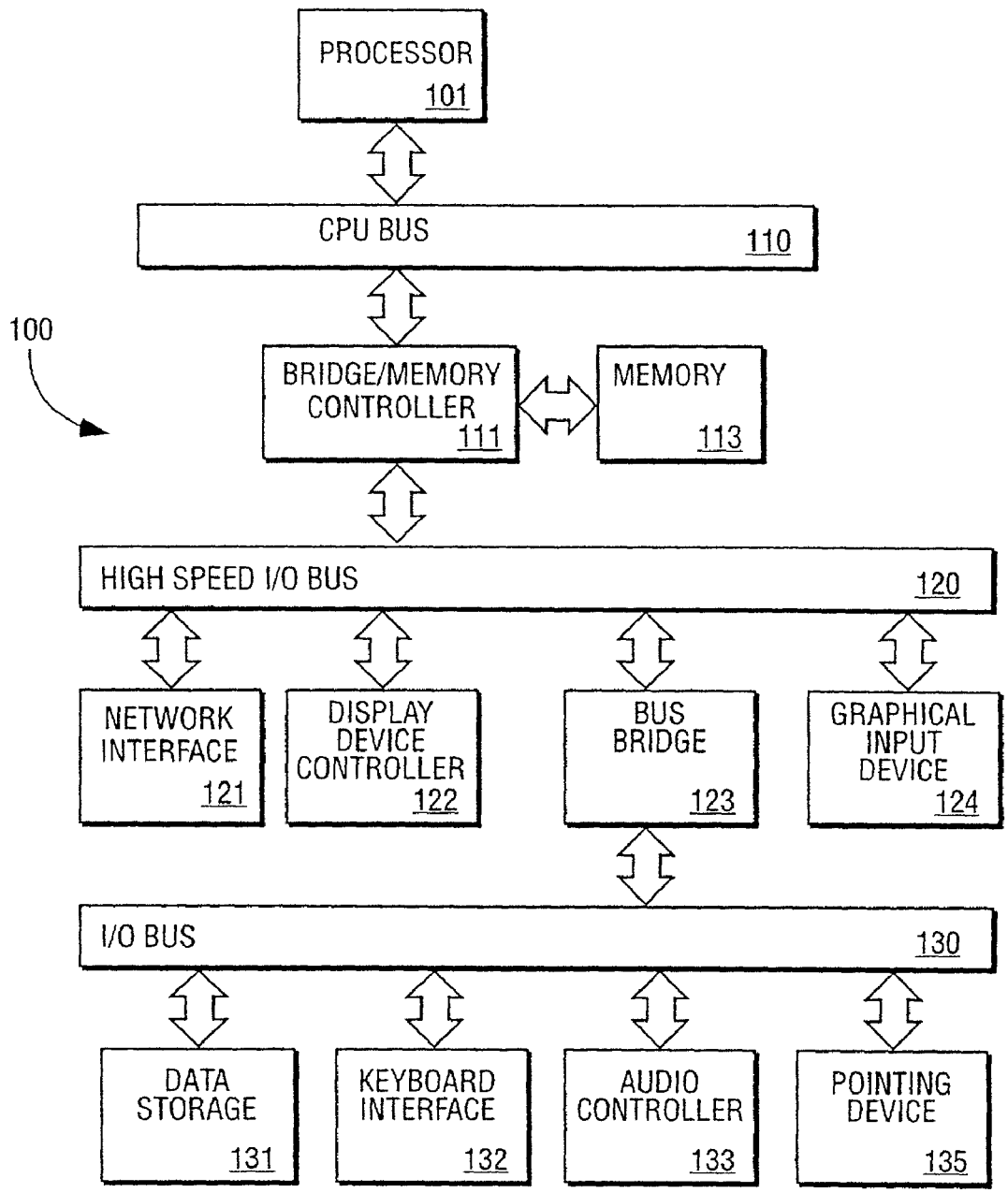
FIG. 1 illustrates a block diagram of one example of a computer system implementing one embodiment of the present invention.

Referring to FIG. 1, an exemplary computer system upon which an embodiment of the present invention can be implemented is shown as 100. The computer system 100 comprises a processor or CPU 101 that processes digital data. The processor 101 can be a complex instruction set computing (CISC) microprocessor, a reduced instruction set computing (RISC) microprocessor, a very long instruction word (VLIW) microprocessor, a processor implementing a combination of instruction sets, or other processor device. The processor 101 is coupled to a CPU bus 110 that transmits signals between the processor 101 and other components in the computer system 100.

For the illustrated embodiment, a memory 113 comprises a dynamic random access memory (DRAM) device, a static random access memory (SRAM) device, or other memory devices. The memory 113 stores information or other intermediate data during execution by the processor 101. A bridge memory controller 111 is coupled to the CPU bus 110 and the memory 113. The bridge memory controller 111 directs data traffic between the processor 101, the memory 113, and other components in the computer system 100 and bridges signals from these components to a high speed I/O bus 120.

For the illustrated embodiment, the high speed I/O bus 120 supports peripherals operating at high data throughput rates. The bus 120 can be a single bus or a combination of multiple buses. As an example, the bus 120 can comprise a Peripheral Components Interconnect (PCI) bus, a Personal Computer Memory Card International Association (PCMCIA) bus, or other buses. The bus 120 provides communication links between components in the computer system 100.

A network interface 121 is coupled to the bus 120. The network interface operates to link computer system 100 to a server or a network of computers and provides communication among the machines. The network interface 121 may be a telephone modem, a cable modem, an Integrated Services Digital Network (ISDN) connection or other interface to a network. A display device controller 122 is coupled to the high speed I/O bus 120. Display device controller 122 is coupled to the bus 120. The display device controller 122 allows coupling of a display device to the computer system and acts as an interface between the display device and the computer system 100. The display device receives information and data from the processor 101 through the display device controller 122 and displays the information and data to the user of the computer system 100. Graphical input device 124 is coupled to the bus 120. The graphical input device 124 operates to input graphical images and/or handwritten or ink data into the computer system 100. The graphical input device 124 may be, for example, a video camera and white board or an electronic pen and tablet or other graphical input devices. Graphical input device 124 may also include conventional handwriting input devices, such as a touch-screen, a digitizer, an electronic tablet, a mouse, an electronic pen, a light pen, or the like.

In the illustrated embodiment, a bus bridge 123 couples the high speed I/O bus 120 to I/O bus 130. The bus bridge 123 comprises a translator to bridge signals between the high-speed I/O bus 120 and the I/O bus 130. The I/O bus 130 is used for communicating information between peripheral devices that operate at lower throughput rates. The I/O bus 130 can be a single bus or a combination of multiple buses. As an example, the bus 130 can comprise an Industry Standard Architecture (ISA) bus, an Extended Industry Standard Architecture (EISA) bus or a Micro Channel Architecture (MCA) bus. The bus 130 provides communication links between components in the computer system 100. A data storage device 131 can be a hard disk drive, a floppy disk drive, a CD-ROM device, a flash memory device or other mass storage device. A keyboard interface 132 allows coupling of a keyboard to the computer system and transmits signals from a keyboard to the computer system 100. An optional audio controller 133 that operates to coordinate the recording and playing of sounds is also coupled to the I/O bus 130. A pointing device 135, such as a conventional mouse or trackball can also be coupled to I/O bus 130.

The present invention is related to the use of the computer system 100 to enable ink data communication between multiple parties on a network. According to one embodiment, enabling ink data communication is performed by computer system 100 in response to the processor 101 executing sequences of instructions contained in the memory 113. Such instructions may be read into the memory 113 from other computer-readable media, such as data storage devices 131 or from the network. Execution of the sequences of instructions contained in the memory 113 causes the processor to perform the functionality described herein. In alternate embodiments, hard-wired circuitry may be used in place of or in combination with software instructions to implement the present invention. Thus, the present invention is not limited to any specific combination of hardware circuitry and software. It will be apparent to one of ordinary skill in the art that the present invention can be used on a wide variety of other computing devices and/or communication devices, such as chat devices, personal digital assistants (PDAs), palm top computers, or similar devices.

Figure 2:
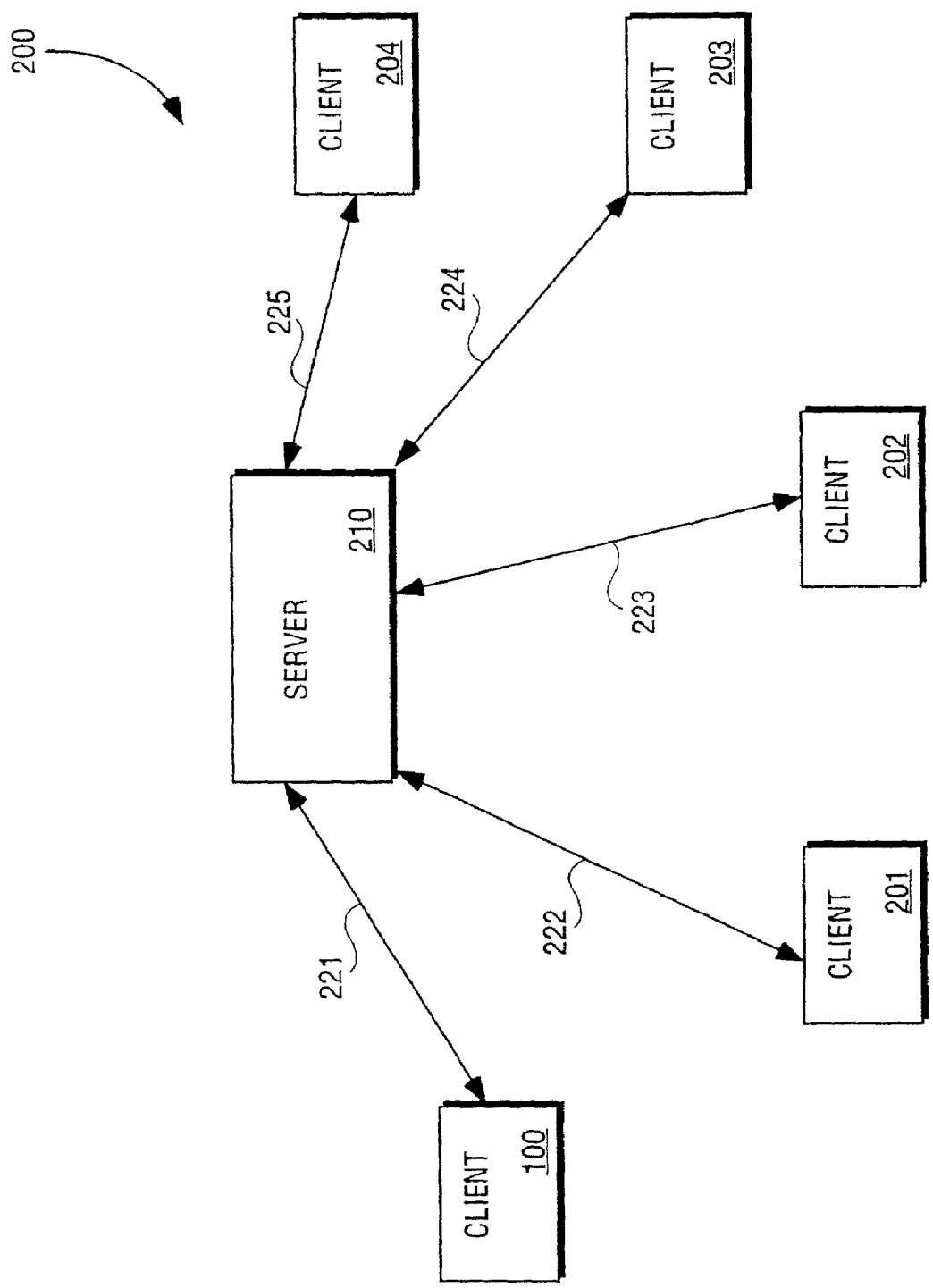
FIG. 2 illustrates a data distribution system implementing an embodiment of the present invention using the uni-cast protocol.

FIG. 2 illustrates a data distribution system implementing an embodiment of the present invention using an uni-cast protocol. Data distribution system 200 is a network comprising a plurality of clients (e.g., users) 100, and 201-204. Clients 100, and 201-204 may be implemented by computer systems such as the one described in FIG. 1. The data distribution system 200 also comprises a server 210. Each client maintains a separate connection with the server 210. Lines 221-225 represent the connection between the clients 100, and 201-204 and the server 210, respectively. Connections 221-225 may be, for example, an Internet connection using Transfer Control Protocol (TCP) or User Datagram Protocol (UDP). According to an embodiment of the present invention, a graphical or ink data message generated from a client is transmitted to the server 210 in the form of a packet of data via its connection. The graphical or ink data message is sent to a queue of messages in the server 210 where other graphical or ink data messages from other clients are stored. A copy of the graphical or ink data messages received from each of the clients are then transmitted to the clients 100, and 201-204 from the server 210 in the order which they were received. The clients 100, and 201-204 store the graphical or ink data messages received from the server 210 in their own queue of received messages. Thus, each client receives a copy of the messages sent to the server 210 in the order that the messages were received by the server 210. The clients 100, and 201-204 display the packets of graphical or ink data messages stored in their queue of received messages on a display device.

According to an embodiment of the present invention, server 210 may be connected to a plurality of other servers configured similarly to form a network of servers sharing graphical or ink data. According to still another embodiment of present invention connections 221-225 may be non-Internet connections over a local area network (LAN) or a wide area network (WAN). The server 210 and the clients 100, and 201-204 may be implemented by any known circuitry. It should be appreciated that the data distribution system 200 may be a single computer system with a plurality of clients connected onto the computer system, wherein the plurality of clients may use inter-process communication to communicate with one another.

Figure 3:
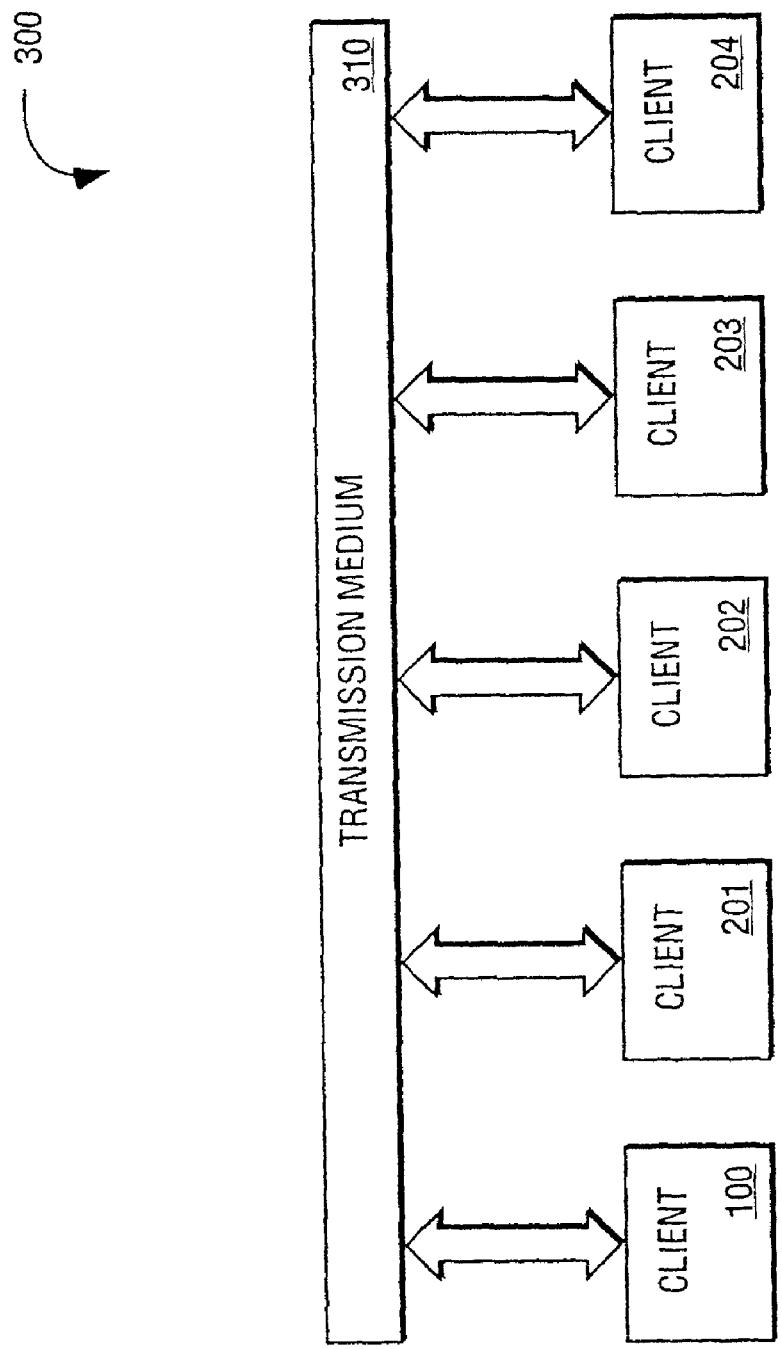
FIG. 3 illustrates a data distribution system implementing an embodiment of the present invention using a multi-cast protocol.

FIG. 3 illustrates a data distribution system implementing an embodiment of the present invention using a multi-cast protocol such as Multicast Internet Protocol. Data distribution system 300 is a network comprising a plurality of clients 100, and 201-204. Clients 100, and 201-204 may be implemented by computer systems such as the one described in FIG. 1. The clients 100, and 201-204 are coupled to transmission medium 310. Transmission medium 310 may be, for example, an Internet network, or a Local Area Network (WAN) or Wide Area Network (WAN). According to an embodiment of the present invention, a first graphical or ink data message is transmitted from a first client 100 to a plurality of other clients 201-204 on the data distribution system 300 as a packet of graphical or ink data via transmission medium 310. Each of the clients 100, and 201-204 have a queue of received messages where messages sent from other clients are stored in the order received. The client sending the message, client 100, also stores a copy of the message it sent to the other clients in its queue of received messages. Clients 201-204 also perform a similar protocol when sending graphical or ink data messages. Each of the clients 100, and 201-204 may display the graphical or ink data messages stored in its queue of received messages on a display device.

One embodiment of the present invention is designed to expand the current chat and instant messaging infrastructure to allow users to communicate with ink data obtained by a graphical or handwriting input device, such as a touch screen, a digitizer, an electronic tablet, a mouse, a light pen, or the like. The use of simple ink data is well known in the art. For example, it is well known to capture hand written input in an electronic form by capturing information associated with the movement of an electronic pen on an electronic tablet. This type of information is commonly called ink data. In conventional technology, ink data is represented as a simple x, y position of the pen at particular increments of time. In more sophisticated conventional ink data capture devices, other parameters including hand position, time, pen pressure, style, color, and other attributes associated with pen movement are captured and reported by the capture device to a processing device through a conventional interface. Although these ink data capture devices exist in the prior art, their application for use in an instant messaging or chat system has not been known or suggested.

Conventional chat systems or instant messaging systems are used conventionally mainly for transporting text from one network user to another network user during a chat session. Many conventional instant messaging players have added voice-transporting capability, but no one currently provides or suggests the use of an ink data format in an instant messaging or chat session. However, the ink data format is particularly well suited for integration with an instant messaging or chat infrastructure for at least the following reasons. First, ink data format is an ideal vehicle for sharing creative activities, such as drawing, architecting, and designing. Secondly, the ink data format is ideal for aiding communication with visual context, such as pointing direction at a map, changing a layout of a floor plan, etc. Thirdly, the ink data format is the most efficient way for people to communicate in many countries outside of the United States. Even within the United States, there are millions of people who cannot type with sufficient speed, but handwriting is usually a very natural and comfortable communication medium for them.

Figure 4:
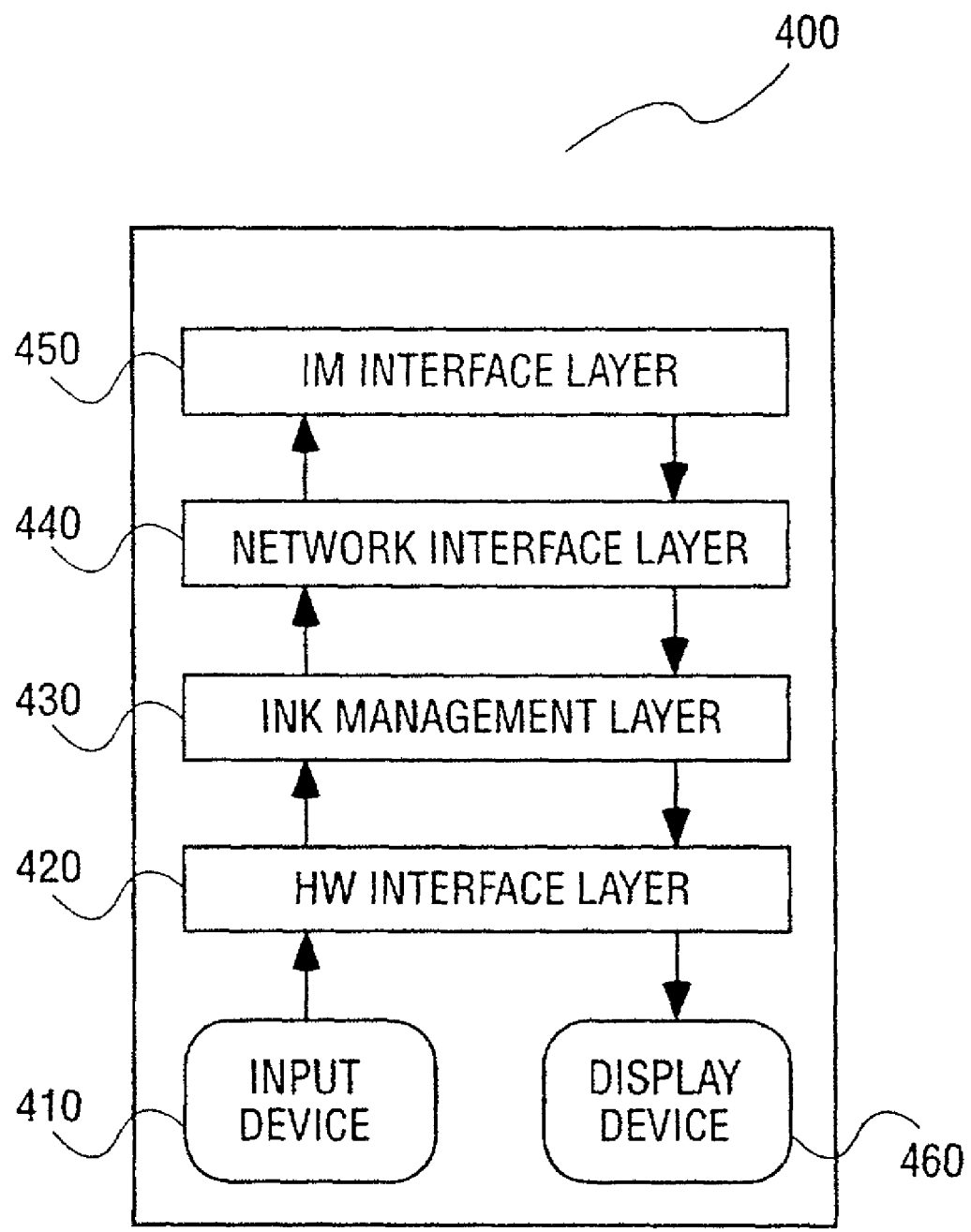
FIG. 4 illustrates the functional structure and processing flow of one embodiment of the present invention.

Referring now to FIG. 4, a block diagram illustrates the basic architecture of one embodiment of the present invention. Input device 410 represents any one of a variety of conventional electronic pen input devices, handwriting input devices, and other types of conventional ink data capture devices. Such input devices 410 produce raw ink data input typically including an x coordinate, a y coordinate, and time information from the ink data capture device. Ink data input device 410 operates with a hardware interface software layer or driver 420 to format the raw ink data into a form suitable for processing at higher functional levels. The x, y coordinate information is used to determine the position of an electronic pen tip at a particular instant in time. Using the timing information provided by input device 410, the handwritten strokes of the electronic pen can be duplicated with a high degree of accuracy thereby increasing the intelligibility and aesthetic appeal of the ink data presentation. This improved intelligibility applies to both human and machine based handwriting recognition. If a more sophisticated ink data input device 410 is used, additional information such as pen pressure, drawing style or line type information, color information, and other types of ink data information may be provided by input device 410 to hardware interface layer 420. It will be apparent to one of ordinary skill in the art that providing additional ink data parameters will improve the rendering and presentation of the ink data information to the remote user.

Once the hardware interface layer 420 assembles the raw ink data into a raw ink data packet, the packet is transferred to an ink management layer 430 as shown in FIG. 4. In general, the ink management layer 430 handles the initial processing of the raw ink data received from the hardware interface layer 420. Depending on the type of data and quantity of data received from input device 410, it may be necessary to compact or compress the raw ink data received through hardware interface layer 420. For example, using conventional techniques, the ink management layer 430 can filter out duplicative raw ink data or interpolate and smooth out raw ink data that may be missing some data. Additionally, ink management layer 430 can use conventional data compression techniques to reduce the amount of data transferred to higher functional levels without reducing the information represented by the raw ink data. As an additional level of functionality, ink management layer 430 can also encrypt the raw ink data using well-known techniques. Further, the ink management layer 430 can apply conventional handwriting recognition techniques to convert the ink data to a text form. Any of these processing functions, such as compaction, compression, encryption, and handwriting recognition may be selectively enabled or disabled using a configuration user interface provided by the present invention. Ink management layer 430 also transforms the raw ink data into a network transportable format. At the completion of its processing of the input raw ink data, ink management layer 430 produces processed ink data, which is transferred to network interface layer 440. Network interface layer 440 handles the conversion of the processed ink data to a form compatible with the local network communication protocol. In some conventional systems, network interface layer 440 may not be necessary if the computing device upon which the present invention is implemented already has an established Internet connection. Such devices, such a desktop personal computer, may already be capable of transporting the processed ink data across the network. However, if such functionality is not implemented or not usable for a particular system using the present invention, network interface layer 440 can convert the processed ink data to a form, which is transportable across a network to a remote user. Once a network transportable form of the processed ink data is produced by network interface layer 440, the network transportable ink data is transferred to a messaging layer 450 such as instant messaging (IM) interface layer 450. Interface layer 450 provides the conventional system infrastructure for transferring instant messages between two users on a computer network. The present invention augments the conventional instant messaging interface layer 450 to include the transport of the processed ink data using the conventional instant messaging infrastructure. In this manner, a user at one network location with an input device 410 that produces ink data may transport the ink data through the instant messaging infrastructure 450 to a remote network user. It will be apparent to one of ordinary skill in the art that other conventional messaging infrastructures may similarly be used. For example, interface layer 450 may also be an interface layer implementing chat functionality. In this embodiment, the network interface layer 440 would provide processed ink data to a chat interface layer, which would transmit the processed ink data to other recipients of messages during a particular chat session. Again, the present invention augments the conventional chat interface layer to provide for the transport of processed ink data to other chat recipients. In yet another embodiment of the present invention, interface layer 450 may be a conventional email transport system. In this case, network interface layer 440 provides the processed ink data to an email interface layer which integrates the processed ink data into a conventional email message and transports the ink data embedded email message to a remote network user by employing the conventional email transport mechanism. Again, an augmentation of the conventional system is necessary to enable the processed ink data to be embedded in a conventional email message for transport by an email application. Thus, the generation and transmission of ink data using conventional chat or email infrastructure is described.

Referring still to FIG. 4, the illustrated embodiment of the present invention includes functionality on the receiver side for receiving chat or an instant message within which ink data is included. On the receiver side, the interface layer 450 will receive a message from a remote user using conventional techniques. Again, the interface layer 450 may be an instant messaging interface, a chat interface, or an email interface. Using any of these conventional vehicles, the message including processed ink data is received by a receiver at interface layer 450. The incoming ink data message is then transferred to network interface layer 440. Network interface layer 440 unwraps the incoming ink data message and extracts the ink data. The ink data packet received via the incoming message is passed from network interface layer 440 to ink management layer 430. Ink management layer 430 is responsible for decoding the incoming ink data message. Depending upon the ink data processing performed by the sender of the message, the ink management layer 430 on the receiver side will decrypt the incoming ink data if the ink data message had been encrypted by the sender. Additionally, ink management layer 430 on the receiver side will decompress the received ink data using conventional techniques. The ink management layer 430 on the receiver may also apply conventional handwriting recognition techniques to the ink data. If necessary, ink management layer 430 on the receiver side will perform further processing on the received ink data to facilitate rendering the ink data on the display device 460 on the receiver side. Once the incoming ink data has been processed by ink management layer 430 on the receiver side, the decoded ink data is transferred to hardware interface layer 420 on the receiver side. Hardware interface layer 420 on the receiver side further formats the ink data for compatibility with the particular display device 460 on the receiver side. Hardware interface layer 420 then transfers the received ink data to display device 460 for presentation to a network user at the receiving end. Thus, ink data captured or produced by a networked sender is transferred via conventional instant messaging, chat, and/or email infrastructure to a network receiver for display at the receiver end.

Figure 5:
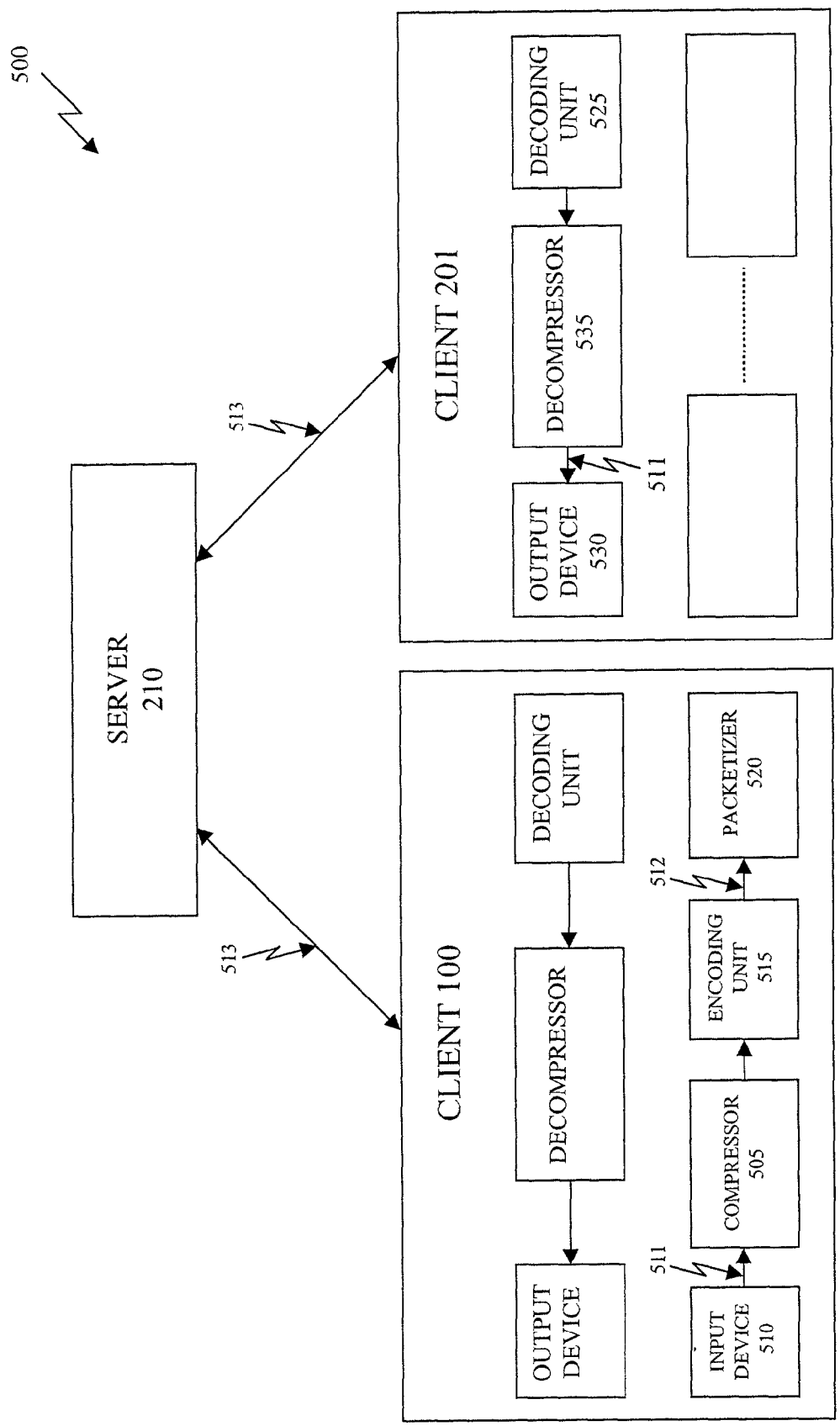
FIG. 5 illustrates a block diagram of an ink data communication device according to one embodiment of the present invention.

FIG. 5 illustrates a block diagram of an ink data communication system 500 according to one embodiment of the present invention. The system 500 includes client 100, client 201, and a server 210. Each client includes an input device, an encoding unit, a packetizer device, a decoding unit, and an output device.

The input device 510 is a handwriting-input device such as a touch-screen, a digitizer, a tablet, or a mouse. The input device 510 collects ink data or information having new format and transmits it to the encoding unit 515. The encoding unit 515 takes this input ink data 511 (i.e., message data) and encodes or converts it into a string of data 512 that has an existing format (i.e., ASCII format). The existing format is supported by a server (i.e., server 210) having an infrastructure (i.e., IM infrastructure). In one embodiment, the data embedded in the data string 512 are scale parameters and a set of ink strokes that include ink color, width, and a collection of X and Y coordinates. It is contemplated that the new format may be any kind of format that is different from the existing format that is supported by the current infrastructure. The client 100 may further include a compressor 505 to decompress the ink data 511 before encoding it and decompressor 535 to decompress the data string back into the ink format data (e.g., the original format message).

Figure 7:
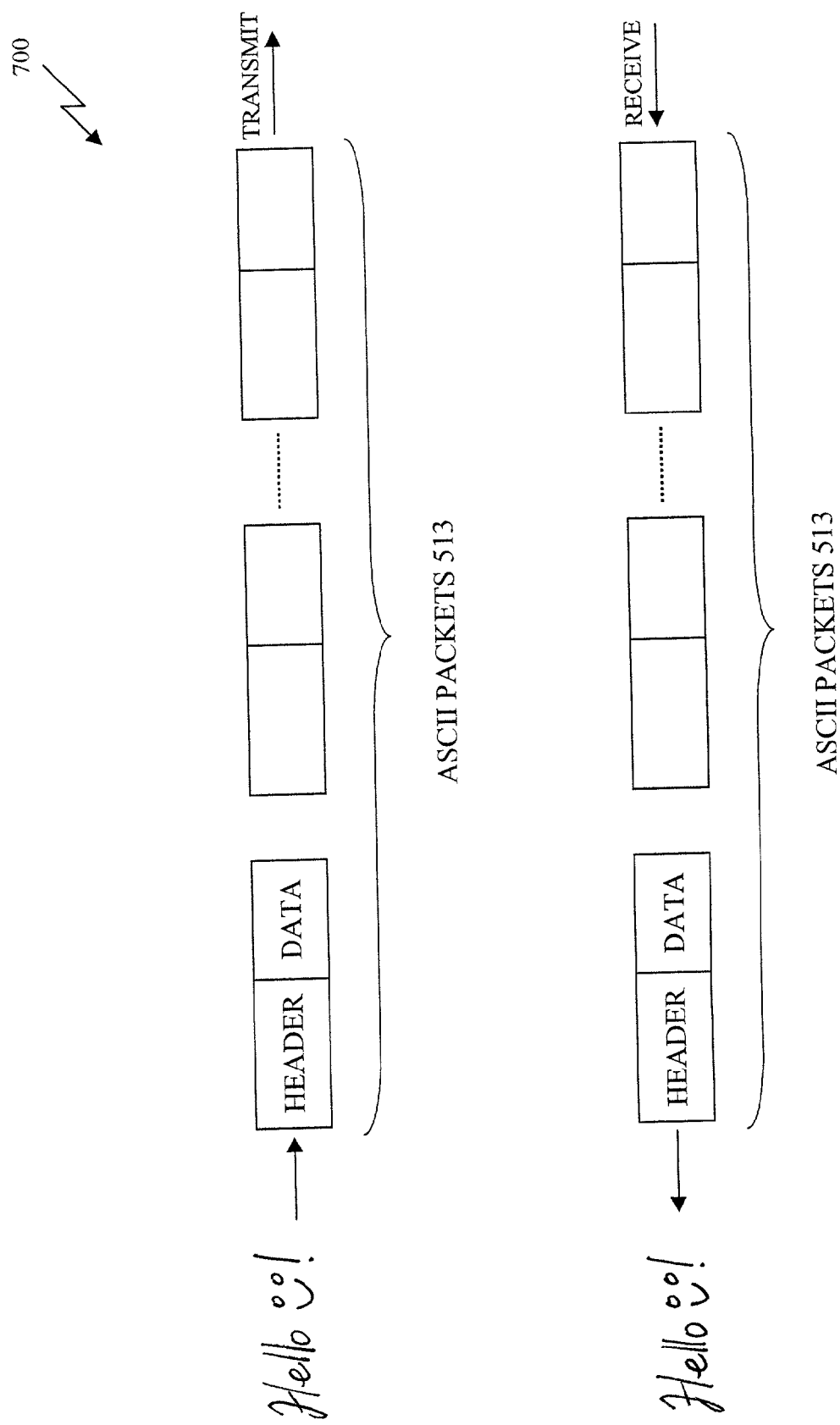
FIG. 7 illustrates an example of how ink format data being transmitted via a network according to one embodiment of the present invention.

The packetizer device 520 takes the data string 512 (i.e., ASCII string) and adds a header to form a new data string 513 (shown in FIG. 7). The header is used to identify the data format (i.e., to identify an ink message). In one embodiment, the data string 513 may be broken into packets. For example, in the case of the IM message, the data string 513 may be broken into packets that are no larger than the maximum message size allowed by the existing IM channel. Each packet may be marked by a header to identify it as having the format different from the existing format. For example, each packet may be marked to identify it as part of an ink message, rather than a regular text message. The data string 513 is transmitted to a network (i.e., server 210) and then be transmitted to the other client (i.e., client 201). The decoding unit 525 decodes the data string 513 and outputs the decoded data to the output device 530.

In other words, the recipient client 201 retrieves the data string 513 from the server 210, the decoding unit 525 may include an examiner or detector (not shown) to examine the headers of the packets in the data string 513. If the examiner determines that the packet contain ink data, the decoder unit extracts the embedded data from the data string 513 and decodes or converts it back into its original form, the ink format data 511 (i.e., converts ASCII data into ink format) and displays it on output device 530.

Figure 6:
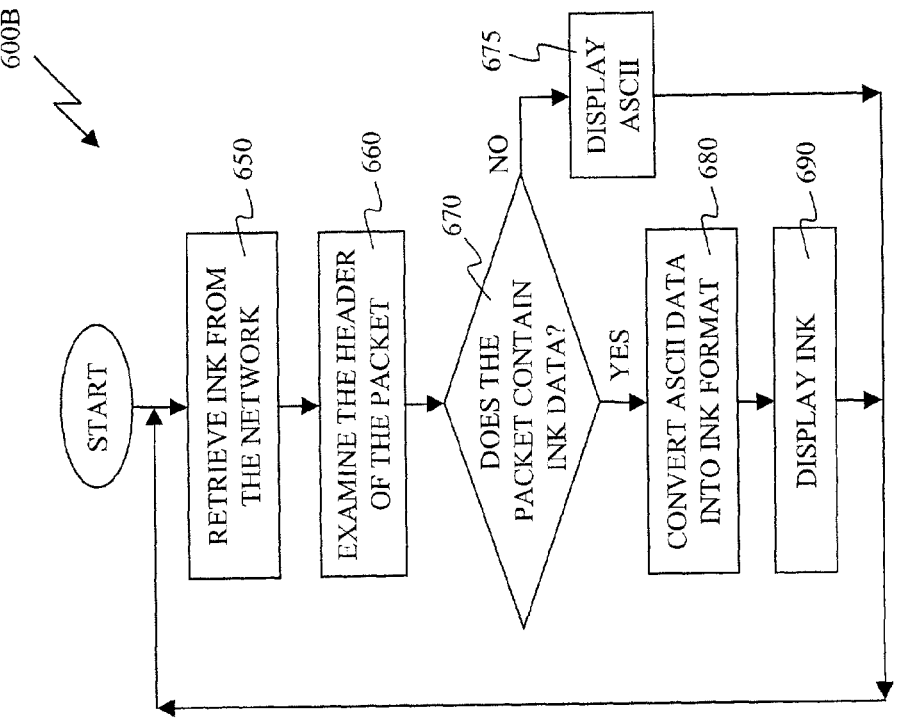
FIG. 6 illustrates flow charts of ink data communication between users according to one embodiment of the present invention.
Figure 6:
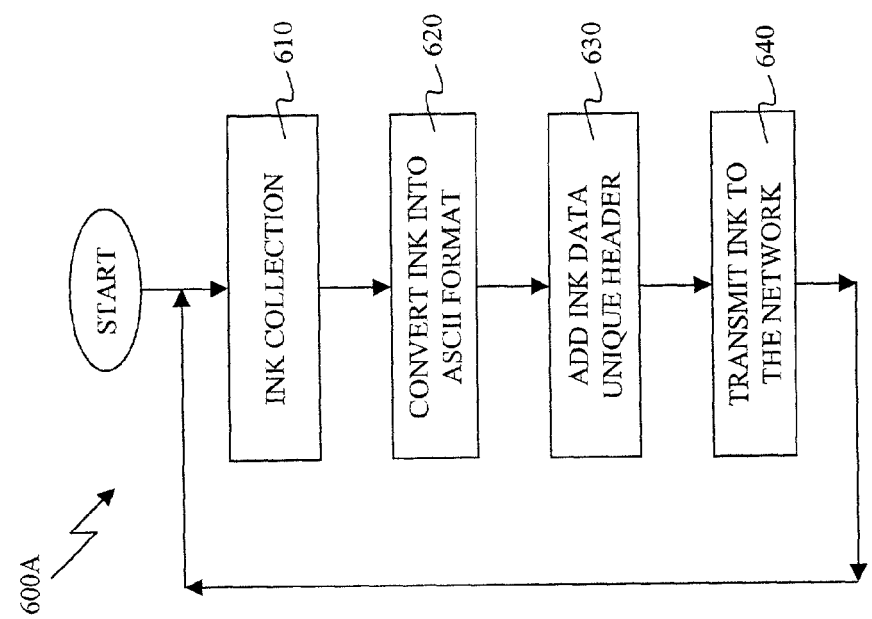

FIGS. 6A-6B illustrate flow charts of ink data communication between users (i.e., clients 100 and 201) according to one embodiment of the present invention.

Upon START, the process 600A collects ink format data (Block 610) from an input device. Next, the process 600A converts or encodes the ink format data into a string data having a different format (i.e., ASCII format) (Block 620). The process 600A continues by adding a unique header to the string data (Block 630). This unique header identifies that the string data is an ink format data. Then, the process 600A transmits the string data to the network (Block 640). The process 600A is terminated.

Upon START, the process 600B retrieves the string data from the network (Block 650) and examines the unique header of the retrieved string data (Block 660). The process 600B then determine whether the packet in the string data contain ink data (Block 670). If the packet in the string data does not contain ink data, the process 600B displays the string data at an output device (Block 675) then the process 600B is terminated. Otherwise, the process 600B converts or decodes the string data into ink format data (Block 680). Next, the process 600B display the ink format data at the output device (Block 690). The process 600B is then terminated.

FIG. 7 illustrates an example of how ink format data being transmitted via a network according to one embodiment of the present invention. The ink format data message "Hello with a smiling face and an exclamation mark" is input via an input device and is encoded into packets having headers. The packets are ASCII packets. The packets are transmitted to a network. The network then transmits the packets to the receiver (e.g., recipient). The receiver receives the packet and examines the header. The header identifies that the packet is the ink format data. The receiver then converts or decodes the ASCII packets into it original form the "Hello with a smiling face and the exclamation mark" message.

Thus, a method and apparatus for implementing ink data communication between multiple parties using computing and/or communication devices on a network is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims

What is claimed is:

1. An apparatus comprising:
a processor, including:
an encoder to encode handwritten input in an ink data format received from a handwriting input device into a string of data having an American Standard Code of Information Interchange (ASCII) format supported by a server having an instant message infrastructure, the ink data format representing the handwritten input as a plurality of x, y coordinate pairs and a corresponding plurality of instances in time, wherein each x, y coordinate pair indicates a position of the handwriting input device at a corresponding instant in time;
a packetizer coupled to the encoder to break the string of data into packets no larger than a maximum message size allowed by the instant message infrastructure, at least one packet having an ink message header identifying the string of data therein as part of an ink message, wherein the at least one packet is transmitted to the server supporting the ASCII format; and
a decoder to decode a received packet encoded in the ASCII format back into the handwritten input encoded in the ink data format, wherein the handwritten input in the ink data format further represents the handwritten input as a plurality of scale parameters and a plurality of ink strokes that include ink color and width.

2. The apparatus of claim 1 wherein the decoder comprises a detector to detect the ink message header and a converter to convert the string of data back into the handwritten input encoded in the ink data format.

3. The apparatus of claim 1 wherein the handwriting input device is one of a touch-screen, a digitizer, an electronic tablet, an electronic pen, a light pen, and a mouse.

4. An apparatus comprising:
a processor, including:
an encoder to encode handwritten input in an ink data format received from a handwriting input device into a string of data having an American Standard Code of Information Interchange (ASCII) format supported by a server having an instant message infrastructure, the ink data format representing the handwritten input as a plurality of x, y coordinate pairs and a corresponding plurality of instances in time, wherein each x, y coordinate pair indicates a position of the handwriting input device at a corresponding instant in time;
a packetizer coupled to the encoder to break the string of data into packets no larger than a maximum message size allowed by the instant messaging infrastructure, at least one packet having an ink message header identifying the string of data therein as part of an ink message; and
a management layer coupled to the packetizer to process the packetized string of data using a processing function, the processing function being enabled or disabled using a configuration user interface, wherein the processing function is one of a filtering, an interpolation, a smoothing, a data reduction, a compaction, a compression, an encryption, and a handwriting recognition; and
an interface layer coupled to the management layer to process the at least one packet into one of an instant messaging, a chat message, and an e-mail message.

5. A method comprising:
encoding handwriting input in an ink data format received from a handwriting input device into a string of data having an American Standard Code of Information Interchange (ASCII) format supported by a server having an instant message infrastructure, the ink data format representing the handwritten input as a plurality of x, y coordinate pairs and a corresponding plurality of instances in time, wherein each x, y coordinate pair indicates a position of the handwriting input device at a corresponding instant in time;
breaking the string of data into packets no larger than a maximum message size allowed by the instant messaging infrastructure, at least one packet having an ink message header identifying the string of data therein as part of an ink message, wherein the at least one packet is transmitted to the server supporting the ASCII format; and
decoding a received packet encoded in the ASCII format back into the handwritten input encoded in the ink data format, wherein the handwritten input in the ink data format further represents the handwritten input as a plurality of scale parameters and a plurality of ink strokes that include ink color and width.

6. The method of claim 5 wherein the decoding comprises detecting the ink message header and converting the string of data into the handwritten input encoded in the ink data format.

7. The method of claim 5 wherein the handwritten input in the ink data format is obtained from the handwriting device selected from a group consisting of a touch-screen, a digitizer, an electronic tablet, an electronic pen, a light pen, and a mouse.

8. A method comprising:
encoding handwriting input in an ink data format received from a handwriting input device into a string of data having an American Standard Code of Information Interchange (ASCII) format supported by a server having an instant message infrastructure, the ink data format representing the handwritten input as a plurality of x, y coordinate pairs and a corresponding plurality of instances in time, wherein each x, y coordinate pair indicates a position of the handwriting input device at a corresponding instant in time;

breaking the string of data into packets no larger than a maximum message size allowed by the instant messaging infrastructure, at least one packet having an ink message header identifying the string of data therein as part of an ink message; and processing the string of data using a processing function, the processing function being enabled or disabled using a configuration user interface, wherein the processing function is one of a filtering, an interpolation, a smoothing, a data reduction, a compaction, a compression, an encryption, and a handwriting recognition; and processing the at least one packet into one of an instant messaging, a chat message, and an e-mail message.

9. A computer program product comprising:

a non-transitory computer usable memory having computer program code embodied therein, the computer program product having:

computer readable program code for encoding handwritten input in a an ink data format received from a handwriting input device into a string of data having an American Standard Code of Information Interchange (ASCII) format supported by a server having an instant message infrastructure, the ink data format representing the handwritten input as a plurality of x, y coordinate pairs and a corresponding plurality of instances in time, wherein each x, y coordinate pair indicates a position of the handwriting input device at a corresponding instant in time;

computer readable program code for breaking the string of data into packets no larger than a maximum message size allowed by the instant messaging infrastructure, at least one packet having an ink message header identifying the string of data therein as part of an ink message, wherein the at least one packet is transmitted to the server supporting the ASCII format: and computer readable program code for decoding a received packet encoded in the ASCII format back into the handwritten input encoded in the ink data format, wherein the handwritten input in the ink data format further represents the handwritten input as a plurality of scale parameters and a plurality of ink strokes that include ink color and width.

10. The computer program product of claim 9 wherein the computer readable program code for decoding comprises computer readable program code for detecting the ink message header and converting the string of data into the handwritten input encoded in the ink data format.

11. The computer program product of claim 9 wherein the handwritten input in the ink data format is obtained from the handwriting device selected from a group consisting of a touch-screen, a digitizer, an electronic tablet, an electronic pen, a light pen, and a mouse.

12. A computer program product comprising:

a computer usable memory having computer program code embodied therein, the computer program product having:

computer readable program code for encoding handwritten input in an ink data format received from a handwriting input device into a string of data having an American Standard Code of Information Interchange (ASCII) format supported by a server having an instant message infrastructure, the ink data format representing the handwritten input as a plurality of x, y coordinate pairs and a corresponding plurality of instances in time, wherein each x, y coordinate pair indicates a position of the handwriting input device at a corresponding instant in time;

computer readable program code for breaking the string of data into packets no larger than a maximum message size allowed by the instant messaging infrastructure, at least one packet having an ink message header identifying the string of data therein as part of an ink message; and computer readable program code for processing the string of data using a processing function, the processing function being enabled or disabled using a configuration user interface, wherein the processing function is one of a filtering, an interpolation, a smoothing, a data reduction, a compaction, a compression, an encryption, and a handwriting recognition; and computer readable program code for processing the at least one packet into one of an instant messaging, a chat message, and an e-mail message.

* * * * *